(12) United States Patent
Chung et al.

(10) Patent No.: US 6,278,973 B1
(45) Date of Patent: Aug. 21, 2001

(54) ON-DEMAND LANGUAGE PROCESSING SYSTEM AND METHOD

(75) Inventors: Pi-Yu Chung, Berkely Heights, NJ (US); Mehryar Mohri, New York, NY (US); Fernando Carlos Pereira, Westfield, NJ (US); Michael Dennis Riley, New York, NY (US)

(73) Assignee: Lucent Technologies, Inc., Murray Hill, NJ (US)

( * ) Notice: Subject to any disclaimer, the term of this patent is extended or adjusted under 35 U.S.C. 154(b) by 0 days.

(21) Appl. No.: 08/570,788

(22) Filed: Dec. 12, 1995

(51) Int. Cl.$^7$ ................................................. G10L 15/18
(52) U.S. Cl. ........................... 704/257; 704/231; 704/254
(58) Field of Search .................................. 395/2.66, 2.65, 395/2.215

(56) References Cited

U.S. PATENT DOCUMENTS 5,086,472 * 2/1992 Yoshida ................................... 381/43

OTHER PUBLICATIONS

Franzini et al, A connectionist approach to speech recognition IEEE/ICASSP 89 pp. 425–428, May 1989.*
Franzini et al, Contin. speech recogn. with connectionist vterbi training ICASSP pp. 1855–1860, Nov. 1991.*
Lee C–H, Rabiner L R, A Netw. based frame–synchronous level building . . . ICASSP pp. 410 to 413, Apr. 1988.*
Fissore et al, Interaction between fast lexical access and word verification . . . ICASSP pp. 279–82, Apr. 1988.*
Bourlard, Morgan, Cont spch recg. by cnnctnst stat. mthds IEEE Trans Neur Netw, v 7, 893–909, Nov. 1993.*
Rabaey etal, A large vocab real time continuous speech recogn sys VLSI sig proc III ch 7 p61–74, Nov. 1988.*

* cited by examiner

*Primary Examiner*—Fan Tsang
*Assistant Examiner*—Michael N. Opsasnick
(74) *Attorney, Agent, or Firm*—Wolff & Samson (57) ABSTRACT

A language recognition methodology is provided whereby any finite-state model of context may be used in a very general class of decoding cascades, and without requiring specialized decoders or full network expansion. The methodology includes two fundamental improvements: (1) a simple generalization, weighted finite-state transducers, of existing network models, and (2) a novel on-demand execution technique for network combination. With the methodology of the invention one or more of the network cascades are formulated as a finite state transducer, and is composed, for a selected portion of the network, with a next successively higher level of the network cascade to prescribe a mapped portion of that next successively higher level corresponding to the portion of the network cascade selected to be expanded.

21 Claims, 7 Drawing Sheets

ON-DEMAND LANGUAGE PROCESSING SYSTEM AND METHOD

FIELD OF THE INVENTION

This application is related to the art of pattern recognition and more particularly to an application of pattern recognition methods for language processing.

BACKGROUND OF THE INVENTION

In the art of language processing, particularly in the application thereof exemplified herein of systems for recognition of natural language in spoken form, an ultimate objective will normally be the recognition and/or classification of an unknown pattern, such as a speech fragment, through use of a set of decision rules applied to a comparison of the unknown pattern and stored parameters representative of patterns of the same general class. In general, the steps in such a recognition/classification process can be described as:

- performing feature extraction for a training set of patterns, thereby providing a parameterized description for each pattern in such a training set, and providing a similar feature extraction for an unknown pattern;
- using a set of labelled training set patterns to infer decision rules, thereby defining a mapping from an unknown object (or pattern) to a known pattern in the training set; and
- carrying out that mapping to define the recognition or classification of the unknown pattern.

In a system for recognizing spoken words or phrases from a natural language, a large corpus of training speech is segmented into elemental speech units such as phones and multiple instances of each phone are used to develop an acoustic model of the phone. Ideally the corpus of training speech will be sufficiently large that virtually all variants of each phone that may be encountered by the recognizer are included in the model for the phone. Each model will be defined in terms of the previously described parameterized description for the modeled speech sound.

The architecture for implementation of the modelling of sound patterns in such a speech recognizer system has become largely standardized. Specifically, the various levels of linguistic information—i.e., the language (or grammar) model, the word pronunciation (or lexicon) models, and the phone models—are represented by a cascade of networks linked by a single operation of substitution. Each network at a given level accepts sequences of symbols. Each of those symbols is modeled by a network at the level immediately below. For example, the pronunciation of each word in a word sequence accepted by the language model will be modeled by a phone string, or, more generally, by a phonetic network encoding alternative pronunciations. Each phone is itself modeled, typically by a Hidden Markov Model ("HMM"), to represent possible sequences of acoustic observations in realizations of the phone. Thus to create the recognizer network, a phone string (or phonetic network) will be substituted for the corresponding word label in the language model and an HMM will be substituted for each phone label in the Lexicon model.

This architecture allows a wide range of implementations. In principle, the cascaded networks can be expanded in advance into a single network accepting sequences of the lowest-level inputs (eg. acoustic observations) by applying recursively the substitution of a symbol by a network. However, if the networks involved are large, full expansion is not practical, since the resulting network would be too large to be computationally tractable. Instead, a typical recognizer system will use a hybrid policy in which some levels are fully expanded but others may be expanded on-demand. In such a recognizer, sequences of hypotheses of units at level i are assembled until they correspond to paths from an initial node to a final node in some model of a unit of level i+1, at which point that higher-level unit is hypothesized.

The hybrid arrangement described above works well so long as the combination of modeling levels can be done by substitution alone. However, an improvement in recognizer systems generally has had the effect of limiting the application of on-demand modeling where that improvement is implemented. It has been determined in recent years that the use of context-dependent units at appropriate levels of representation significantly improves the performance of such a recognition system. By its very nature, a context-dependent model, u/c (for unit u in context c), can be substituted for an instance of u only when that instance appears in context c. In prior-art recognizer systems, this constraint is addressed in one of two main ways. If the cascaded networks involved are small enough, the full cascade is expanded in advance down to the level of context-dependent units, using a specialized expansion algorithm that folds in context dependency appropriately. If full expansion is not practical, as, for instance, in large-vocabulary recognition, the standard solution is to use restricted model structures and specialized algorithms to allow on-demand combination of representation levels. A particular problem occurs at word boundaries, where context must be determined as to each adjacent word which can appear in that position. Here, because of the multiplicity of possible contexts for a phone at a word boundary position, substitution does not work. A common restriction is to allow only one-sided context-dependent models at such word boundaries. But even where full context-dependency may be implemented, the particular context-dependency type (eg. triphonic, pentaphonic) must be built into the decoder, thereby preventing any other form of context-dependency being used with such a recognizer system.

SUMMARY OF THE INVENTION

A language recognition methodology is disclosed whereby any finite-state model of context may be used in a very general class of decoding cascades (where paths through such cascades are defined by connections among a number of predetermined states), and without requiring specialized decoders or full network expansion. The methodology includes two fundamental improvements: (1) a simple generalization, weighted finite-state transducers, of existing network models, and (2) a novel on-demand execution technique for network combination. The steps of the methodology of the invention include: (1) formulating at least one of the network cascades as a finite state transducer, where that transducer represents a mapping function between the network cascade and an adjacent cascade; (2) selecting a state in a transducer at a selected level in the cascade having a correspondence to a portion of the network cascade to be expanded; (3) composing that transducer with a next successively higher level of the network cascade to prescribe a mapped portion of that next successively higher level corresponding to the portion of the network cascade selected to be expanded; and (4) iteratively repeating step (2) and step (3) for each successively higher level cascade representing the portion of the network selected to be expanded.

DETAILED DESCRIPTION OF THE INVENTION

For clarity of explanation, the illustrative embodiment of the present invention is presented as comprising individual functional blocks. The functions these blocks represent may be provided through the use of either shared or dedicated hardware, including, but not limited to, hardware capable of executing software. For example the functions of modules presented in FIGS. 11 and 12 may be provided by a single shared processor. (Use of the term "processor" should not be construed to refer exclusively to hardware capable of executing software.)

Illustrative embodiments may comprise microprocessor and/or digital signal processor (DSP) hardware, such as the AT&T DSP16 or DSP32C, read-only memory (ROM) for storing software performing the operations discussed below, and random access memory (RAM) for storing results. Very large scale integration (VLSI) hardware embodiments, as well as custom VLSI circuity in combination with a general purpose DSP circuit, may also be provided.

INTRODUCTION

The invention disclosed herein will be described in terms of a system and method for recognizing spoken natural language (referred to herein as a speech recognition system and/or method) which constitutes a preferred embodiment of the invention. It will, however, be apparent to those skilled in the art that the methodology of the invention is broadly applicable to a variety of pattern recognition tasks.

Figure 1:
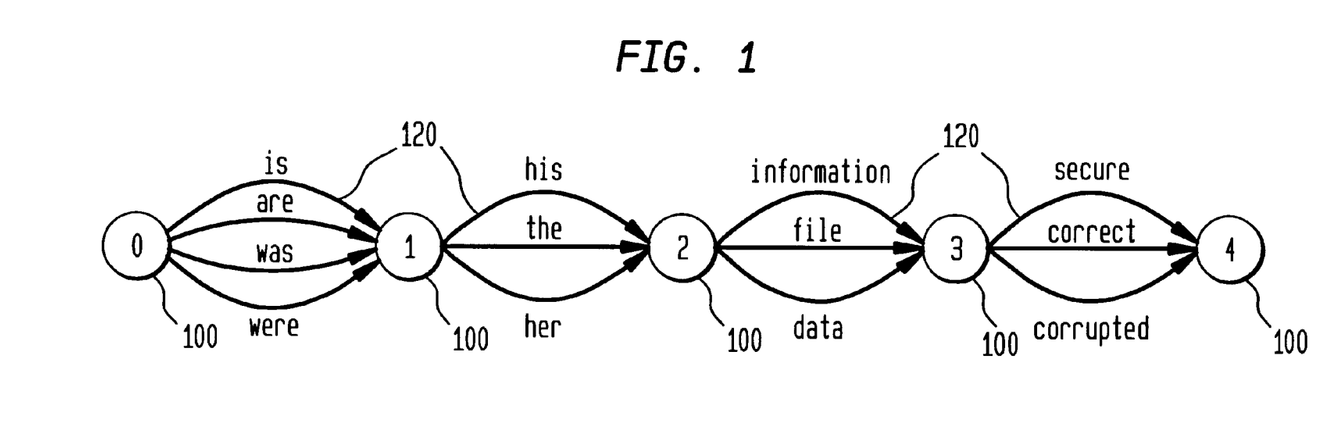
FIG. 1 depicts an illustrative grammar for a speech recognizer.

In a typical speech recognition system, a classification or recognition network is constructed using words and sub-word units (such as phones) from a corpus of training speech. That network will be comprised of a series of cascaded network models for modeling words and sub-word units expected to be recognized. At the highest level of such a cascade will be a network model for defining the "legal" (i.e., acceptable to the recognizer system) structure of phrases which can be recognized, along with the vocabulary of words that can appear at each position in that structure. This top-level network model is commonly referred to as a language model, or as a word graph, or as grammar for the recognizer. In FIG. 1 an illustrative (albeit highly simplified) grammar for a recognizer is shown. As can be seen in the figure, this illustrative grammar is directed to phrases of the type: "are the data correct". The nodes of the grammar numbered 0–4, and indicated generally by 100, define the word boundaries for a phrase to be recognized. Such nodes may also be called "states". The arcs connecting each node, illustratively designated 120, represent words which can appear in the grammar position defined by the nodes between which an arc is connected. To place the simplified grammar model used here for illustration in perspective, in a "real-world" recognizer system, the grammar model would be expected to have a set of nodes measured at least in the thousands and a set of arcs measured at least in the hundreds of thousands. Indeed, for a large recognizer recently built by the inventors and others, the grammar contained approximately 34 million word arcs (representing a recognizer system vocabulary of approximately 60,000 words).

Figure 2:
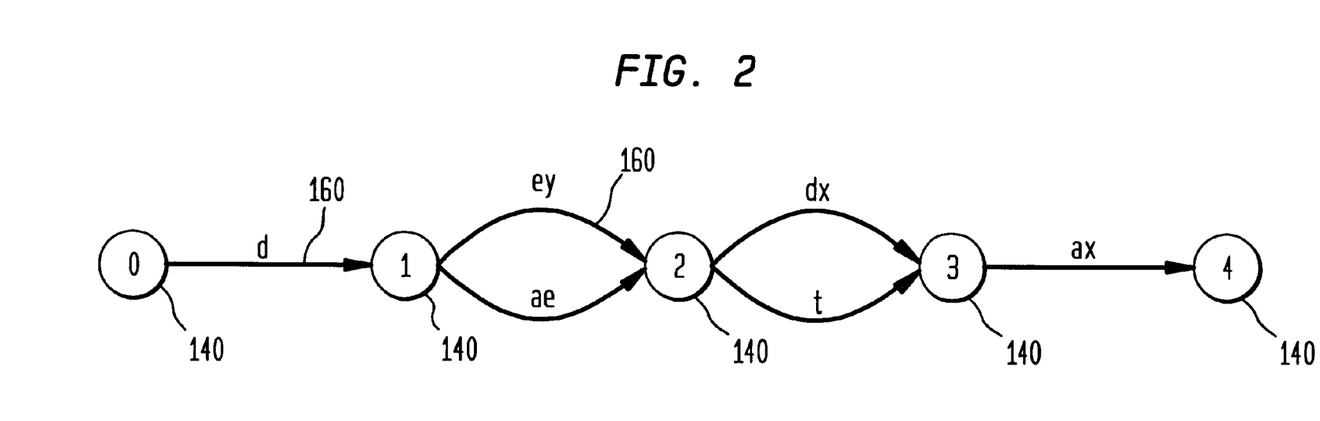
FIG. 2 shows an illustration of a phonetic sub-network for a speech recognizer.

At a next lower level in the network cascade is a sub-word unit network model, where the sub-word units for the words in the grammar network, typically the phonetic transcriptions of those words, are modelled. Such a network level may take the form of a phone string for each such word, or in the case of a word subject to multiple pronunciations, the form of a phonetic sub-network. Such a phonetic sub-network is illustrated in FIG. 2 as representing the alternate pronunciations of the word "data" in the grammar of FIG. 1. As can be seen, the phonetic sub-network is also modelled as a sequence of nodes (generally indicated as 140), each pair being interconnected by one or more arcs (illustratively indicated as 160). In this case, however, the arcs represent phones, with the arcs connecting a given pair of nodes corresponding to alternate pronunciations. In the case of a word having only a single accepted pronunciation, the phonetic sub-network illustrated in FIG. 2 would be replaced by a single phonetic string. In a context independent recognition system, each of the phones modelled at this level would typically be mapped to a Hidden Markov Model modeling that phone for comparison with the parameters of an unknown sound.

It has been found in the last few years that the performance of a recognition system can be significantly improved by adding context dependency for the phones modelled by the network. As will be appreciated, with context dependency modelling, rather than having a single model for a particular phone, a potentially large number of models will be required to represent that phone in all allowable contexts.[1] A triphone context-dependency model is commonly implemented—i.e., the phone of interest in the context of its left environment and its right environment—and can be illustrated by again referring to the phonetic sub-network for the word "data" shown in FIG. 2. Consider the phone "t" in the lower arc between nodes 2 and 3. The right environment context for that phone will be the "ax" represented by the single arc between nodes 3 and 4. However, the left environment context for that phone may be either the "ey" phone for one pronunciation of the "a" in "data" or the "ae" phone for the alternate pronunciation. Thus two context-dependent models will be required to represent the "t" sound in the indicated pronunciation, and as can readily be seen two context dependent models will be required to represent the "dx" sound in the alternate pronunciation. This illustration of the multiplying effect on recognition models with context dependency for a word with multiple pronunciations is sort of a microcosm for the much more serious multiplication effect which occurs at word boundaries. If one considers the sound "d" between node 0 and node 1 of FIG. 2, it will not only require multiple right context-dependent models, reflecting the alternative pronunciations of the "a" in "data", but for its left environment, a context-dependent model must be constructed for the final phone in each word which is allowed to proceed it in the grammar model. In the simplified grammar model of FIG. 1, this would require six context-dependent models for the "d" sound of "data—"— each of the last phones in "his", "the" and "her" as a left context for "d" with each of the phones "ey" and "ae". When one considers that in a real-world grammar model, there will typically be hundreds and possibly thousands of word arcs terminating at a given node, it can readily be seen, as previously noted that a simple substitution from one level to the next is no longer viable. Additionally, the use of context dependent models will result in a significant growth in the number of phone models which must be constructed for a given word in the vocabulary of a recognizer system. The inventors have determined empirically that the combination of multiple left or right context environments at word boundaries and the similar phenomenon at phone boundaries in the case of words having multiple pronunciations produces a multiplier effect of between 3 and 10 in the number of phones that must be considered during the recognition, relative to the phones to be dealt with in a context independent system.

*/ Given a triphone context dependency model and the fact that words in the English language can be characterized in terms of approximately 40 phones, the number of triphone context dependencies potentially to be modelled is on the order of $40^3$.

METHOLOGY OF INVENTION

It should be clear at this point that, for a large recognizer, the number of units to be modeled in a recognizer based on context dependency is simply too great to practically utilize the prior art technique of expanding each network cascade into a single network accepting sequences of the lowest level input. Using the prior example of a recognizer with a 34 million word grammar, assuming an average of 5 phones per word and taking the midpoint of the range for a context dependency multiplier (6.5), it can be seen that over one billion units (34,000,000×5×6.5=1,105,000,000) must be modelled and stored for a full expansion of the network. Even assuming that the network construction is done off-line and that the computational resources required are within acceptable limits, the amount of memory required to store that vast amount of data during the recognition process is beyond the realm of practicability.²⁾

**/ It should also be clear that even for a recognizer with a sufficiently small grammar that a fully expanded context-dependency network model could be stored in a realizable memory, such memory is one of the more costly elements of a recognizer system. Therefore, an on-demand network expansion methodology according to the methodology of the invention also provides a significant advantage in the form of reduced memory cost.

Thus some method is required for expanding the network on a partial basis as needed to address a particular unknown speech fragment, such as the "on-demand" methodology discussed above.³⁾ As noted in connection with that discussion, there are serious constraints to the use of prior-art on-demand methods in a context dependency network. However, as shown below, the invention disclosed herein overcomes those constraints and permits essentially unconstrained usage of the on-demand network construction technique for context dependency networks.

***/ With such on-the-fly expansion, the total memory requirement will be essentially that needed to store the total number of units to be operated on—e.g., the 34 million word arcs for the exemplary grammar and approximately 220,000 [$60^3$] context dependent phones—rather than all possible combinations of those units.

In the Background discussion, it was noted that the traditional prior art method of substitution from one level of network model to another is generally not viable for an on-demand construction of context dependency networks, at least in the case of word boundaries and words having multiple pronunciations. To overcome that limitation the methodology of the invention builds on a novel application of the concept of transduction—more particularly, the application of weighted finite state transducers to implement one or more of the network models described above. The idea of using finite state transducers, in language processing is developed at length in an article by two of the inventors (and one other) [Pereira, F., Riley, M. & Sproat, R., "Weighted Rational Transductions and their Application to Human Language Processing", *Proceedings of the Human Language Technology Workshop*, Mar. 8–11, 1994, Plainsboro, N.J., pp.262–267], which is incorporated herein by reference. Accordingly, those underlying ideas are only briefly discussed here as background for understanding the methodology of the invention.

Network models are typically given as HMMs, which, as shown in the referenced article, can be equivalently represented as probabilistic finite-state automata (PFSAs). With either such representation, probabilistic arcs are labeled by symbols accepted (or emitted) in the arc. In PFSA terms, substitution corresponds to replacing each arc labeled with unit u by a copy of the PFSA that models it in terms of lower-level units.

Figure 3:
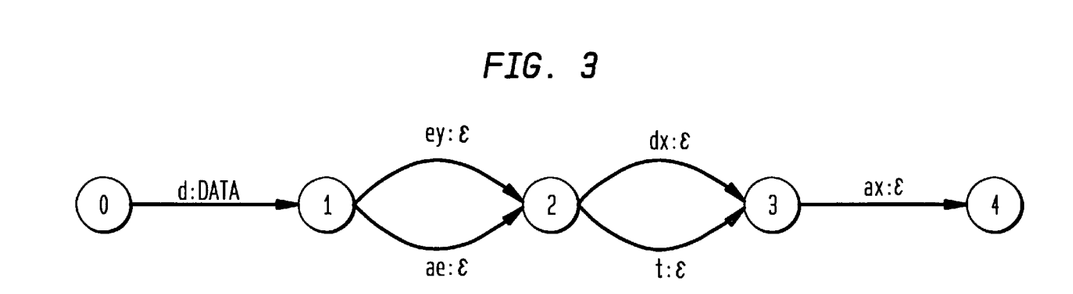
FIG. 3 provides an illustrative example of a finite-state transducer.

Weighted finite-state transducers generalize PFSAs by replacing the single label of a arc by a pair, i:o, of an input symbol i and an output symbol o.⁴⁾ An illustrative example of such a transducer is shown in FIG. 3, using the word "data" to show a comparison with the phonetic network of FIG. 2. As can be seen in the figure, each arc contains not only the phone represented by that arc, but also an output term. At the first arc from the start node (node 0) the output parameter is the word ("data") to which each phone string represented by the network is to be mapped. However, for subsequent arcs in the network, it is not necessary that this output word be repeated, so the output term is indicated as "ϵ" to indicate a free position, or no change in the output term.

****/ If i(o) is the empty string, the arc consumes no input (and produces no output).

In other words, each path from an initial state to a final state in a transducer relates the sequence formed by the input symbols on the path's arcs to the sequence formed by their output symbols, and assigns this correspondence the accumulated weight (e.g., product of probabilities or sum of log probabilities) of the arcs in the path.⁵⁾

*****/ In general, several paths may relate a given input sequence to possibly distinct output sequences. Also, a transducer can be trivially inveited by exchanging inputs and outputs.

Figure 4:
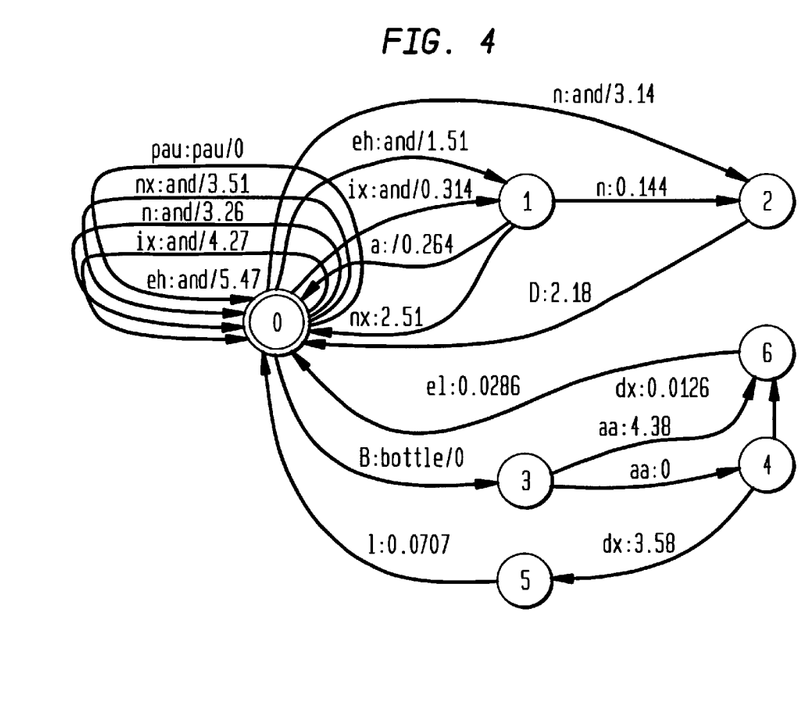
FIG. 4 shows a transducer representing a lexicon network model for a speech recognizer.
Figure 5:
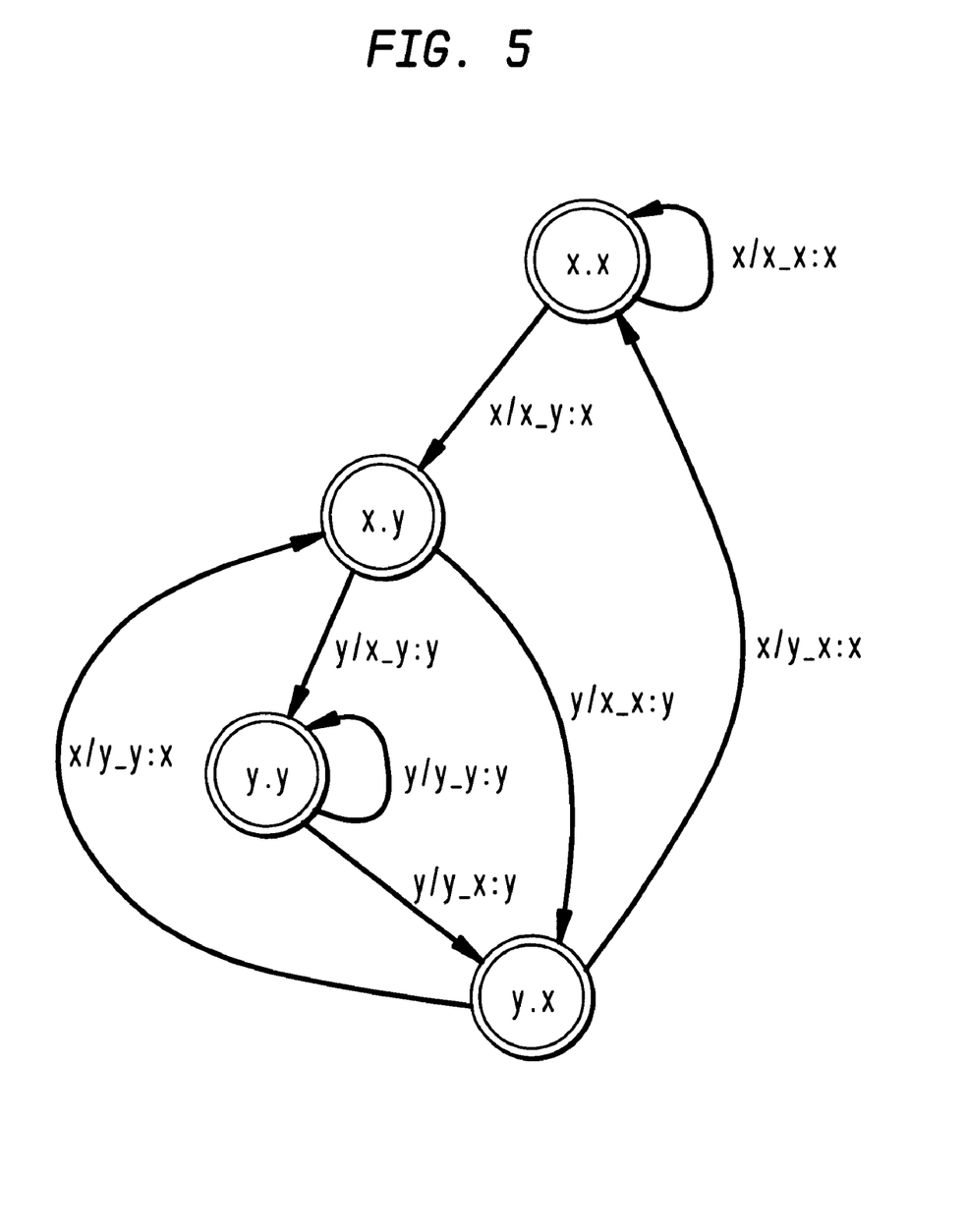
FIG. 5 shows a transducer representing a context dependency model according to the method of the invention.

The connection between two modeling levels i and i+1 is readily represented by a weighted transducer that reads sequences of level i units and outputs sequences of level i+1 units. For instance, the transducer in FIG. 4 represents a lexicon (albeit, a very small lexicon). It gives a mapping from phone sequences to words in the lexicon, in the example "and" and "bottle," with weights representing corpus-derived log likelihoods of alternative pronunciations. This transducer encodes the substitution of phone sequences for words. In contrast, the transducer of FIG. 5 represents a context dependency model and does not correspond to a substitution. It expresses (for simplicity, using just two hypothetical phones x and y) the mapping from context-dependent triphonic models, symbolically represented as phone/left context_right context to the phones themselves.

Thus as can be seen, context-dependency can be represented directly as a network, without requiring specialized context-dependency code in the recognizer.

Figure 6:
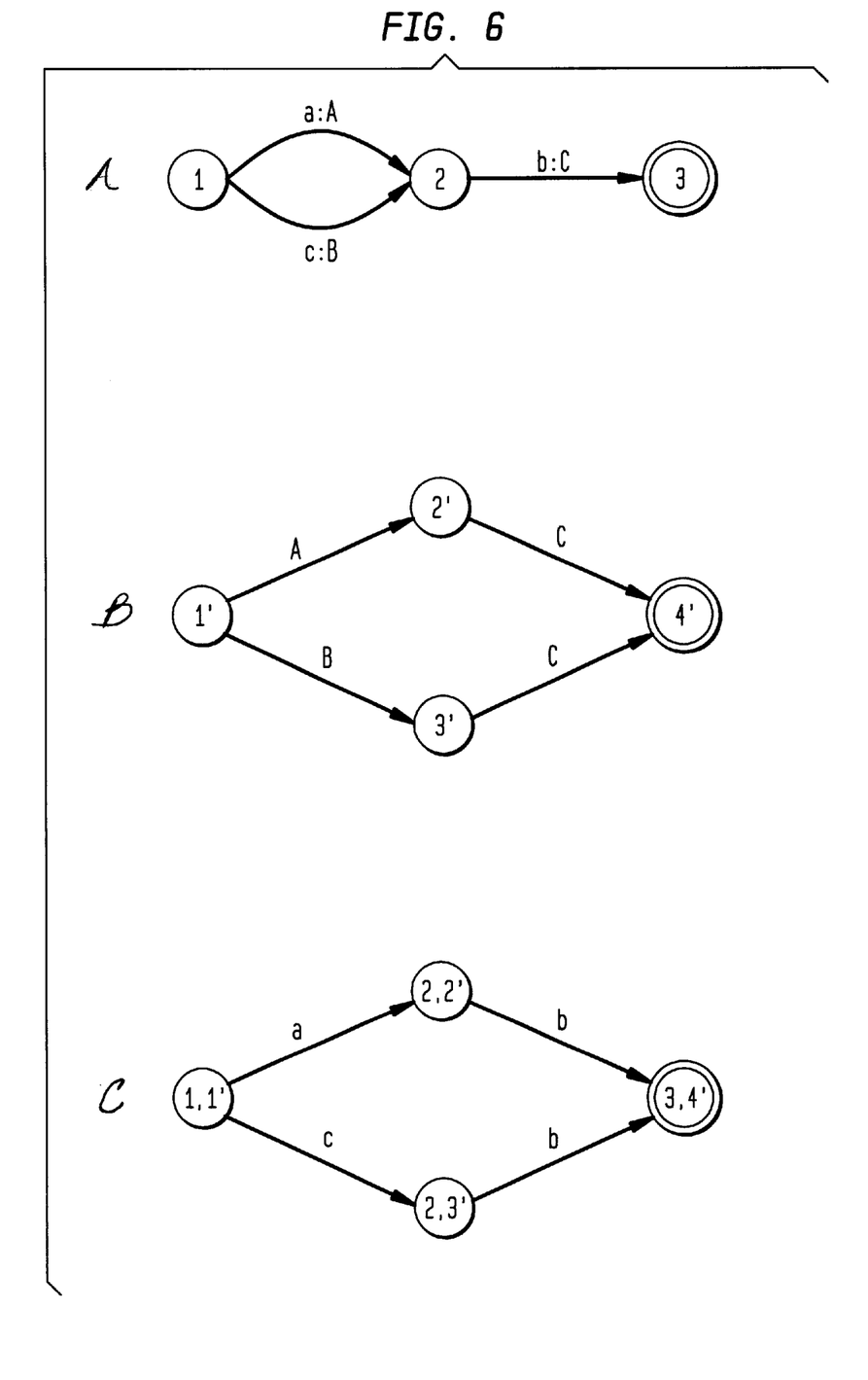
FIGS. 6A, 6B and 6C provide an example of composition for finite-state transducers according to the method of the invention.

Transducers of the form described above can then be composed, yielding a transducer from context-dependent triphonic models to word sequences that is guaranteed to represent all the required cross-word context dependencies. In general, the composition of two transducers R and S is a transducer T that has exactly one path mapping sequence u to sequence w for each pair of paths, the first in R mapping u to some sequence v and the second in S mapping v to w; weights are combined appropriately. Although the idea of transducer composition in language processing is developed at length in the referenced article of the inventors, the concept will be briefly describe here in the context of an exemplary such composition, as illustrated in FIG. 6. The network designated I in the figure is a transducer where the input is represented as a lower case letter, which can be thought of as representing phones, and the output is a capital letter, which similarly may be thought of as representing words. Thus the transducer here can be seen as equivalent to a lexicon network. The network designated II. in the figure is an acceptor (which can be composed with a transducer but has no output function). The arcs for the acceptor are labelled with capital letters, corresponding to words, and this acceptor can accordingly be seen as equivalent to a word grammar. The composition of the transducer (I) and the acceptor (II) is designated III in the figure. In such a composition, there will be a state in the output (III) for every pair of states in the input (I & II), and an arc will be created in the output between any two states where there is a matching label between the corresponding states in each input—e.g., arc a:A between nodes 1 and 2 in the transducer composed with arc A between nodes 1' and 2' in the acceptor produces arc a between nodes 1,1' and 2,2' in the output.[6/] Thus composition can be seen as a prescription for replacing the capital letters (words) with the corresponding lower case letters (phones)—i. e., a process for mapping fiom one level to another.

******/ Although the composition example shown in FIG. 6 used the case of a context independent transducer for simplicity of illustration, it should be apparent that exactly the same process would apply in the case of a context dependent transducer, such as the transducer illustrated in FIG. 5.

An important advantage of transducer composition is that it can be easily computed on demand. To exploit this property, a fully general on-demand composition algorithm has been developed, which creates on demand, and optionally saves for reuse, just those states and arcs of the composed transducer that are required in a particular decoding run—for example, those required for paths within a given beam width from the best path.

The development of that on-demand composition algorithm can be described as follows. All of the networks considered above can be represented as finite automata and thus can also be represented as generalized state machines. A generalized state machine M supports the following operations:

M.start–returns, on request, the start state for machine

M.final(state)–probability (or cost) of accepting at a given state

M.arcs(state)–for given state, returns transitions ($a_1$, $a_2$, ... $a_N$) leaving state, where $a_i$=(input label, output label, weight & next state)

This generalized state machine concept can then be used to implement on-demand composition of a portion of a recognition network needed for operating on a specific unknown speech fragment. In particular, one can create a new generalized state machine C as a composition of state machines A and B which supports the following operations C.start:=returns A.start paired with B.start C.final((s1,s2)):=for state s1,s2, returns A.final(s1)+ B.final(s2)

C.arcs((s1,s2)):=for state s1,s2, returns Merge(A.arcs(s1), B.arcs(s2))

where merged arcs are defined as:

(label 1, label 3, x+y, (next state 1, next state 2))E Merge(A.arcs(s1), B. arcs(s2))

iff (label 1, label 2, x, next state 1 )E A.arcs(s1) and (label 2, label 3, y, next state 2)E B.arcs(s2)

As an additional feature of the invention, a state caching may optionally be implemented to significantly improve the efficiency of the on-demand composition algorithm described above. Again using the generalized state machine idea, a new state machine N will be created from input machine M being defined by the following characteristics:

N.start:=M.start

N.(final(state):=M.final(state)

N.arcs(state):=M.arcs(state) With such a state cache machine, any of the following cache disciplines can be implemented:

Expand each state or M exactly once, i.e., always save in cache;

Cache, but "forget "old" states using a least recently used criterion;

Use instructions from a user to save and forget.

In a further refinement of the methodology of the invention, a "filter" may be added to the composition of two transducers which can lead to both increased accuracy and improved computational efficiency. Such a filter is related to the previously noted facet of finite-state transducers that an arc in such a transducer may be represented using the symbol "epsilon" which denotes the "empty word" or a "free move". Either input or output labels can use the epsilon representation. An epsilon at the input position means that no letter needs to be consumed when moving from the start state of a transition to its destination state. In the same way, an epsilon at the output position means that no letter is output when moving from start to destination state.

The use of epsilons in the representation of transducers is necessary, since input and output strings do not always have the same length. This use is also convenient because it allows one to delay (or not delay) inputs or outputs, which will often have important computational effects. In the case of weighted finite-state transducers, which will generally be used in language processing, epsilon-transitions may also have weights.

Figure 7:
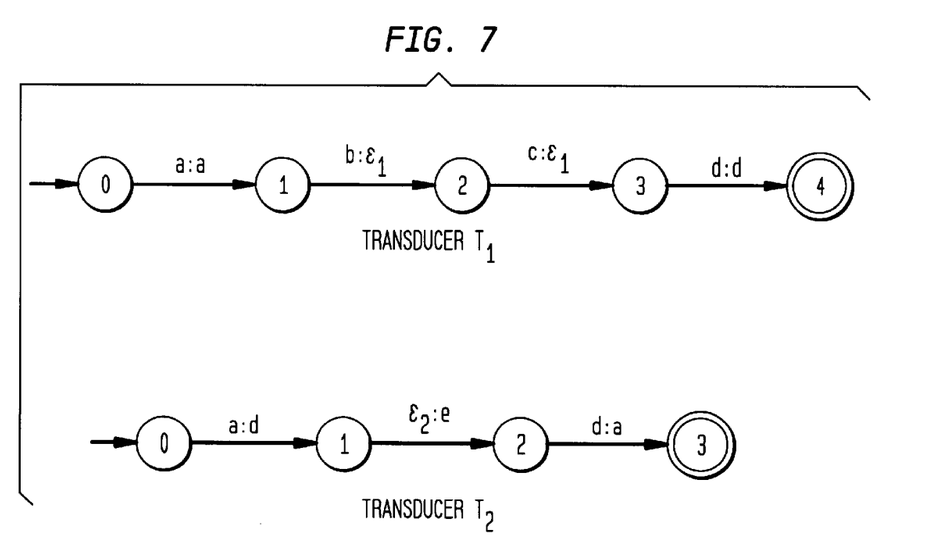
FIG. 7 shows two transducers T1 and T2 having epsilon outputs and inputs.
Figure 8:
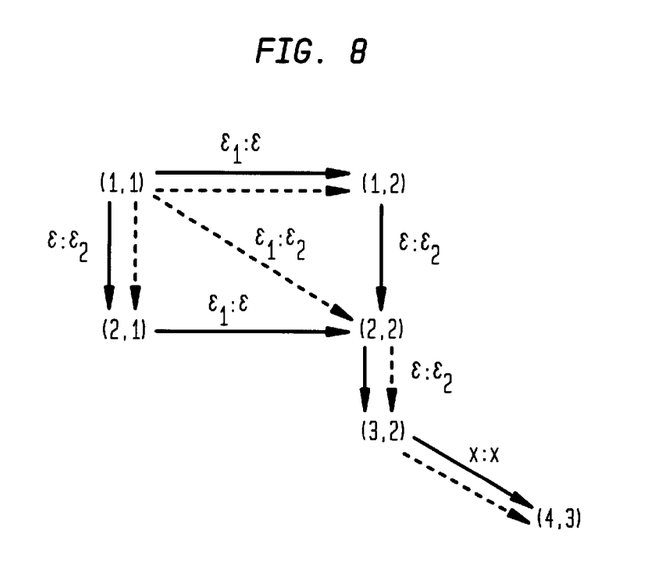
FIG. 8 illustrates various ways of combining the two transducers of FIG. 7.

As previously discussed, finite-state transducers represent mappings and as such can be composed. The composition operation in the case of weighted finite-state transducers is more complex, however, because of the possible presence of weighted epsilon-transitions. This added complexity is illustrated by FIGS. 7 and 8. FIG. 7 show two transducers T1 and T2 having epsilon outputs and inputs, respectively. For the sake of clarity, the epsilon-transitions of the two transducers are distinguished by different indices.

FIG. 8 indicates the various ways of combining the two transducers. In this figure, epsilon (without indices) is the empty label as previously defined. Here it can be more specifically interpreted in the following way: an epsilon on input means that no move is made in the first transducer and an epsilon on output means that no move is made in the second transducer. Each node of the graph of FIG. 8 corresponds to a pair of states of T1 and T2.

Each path from (1,1) to (4,3) corresponds to a distinct way of using the epsilon-transitions of the two transducers depending on the order in which the free moves are made. But, for composition to be correct, only one of these paths should be kept in the result, or else the total weight could be counted as many times as the number of distinct successful paths.

Figure 9:
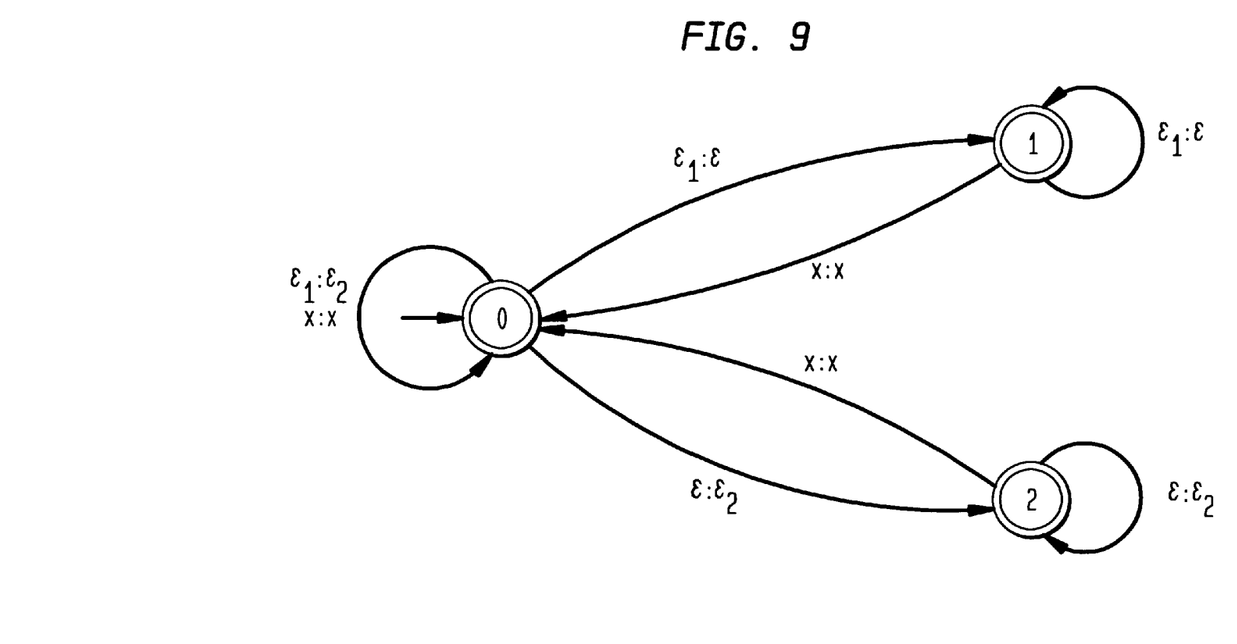
FIG. 9 shows an illustrative embodiment of a composition filter according to the method of the invention.

To keep only one of these paths, a 'filter' can be inserted between T1 and T2 which removes the redundant paths. The filter can itself be defined and represented as a finite-state transducer. An illustrative embodiment of this filter is shown in FIG. 9. As with FIG. 8, the symbol "x" represents any element of the alphabet of the two transducers. Such a filter leads in many cases to a fewer number of transitions in the result, and often to a better time efficiency. It will be understood that different filters can be defined to limit this redundancy.

The filter can be read in the following way: as long as the output of T1 matches the input of T2, one can move forward on both and stay at state 0; if there is an epsilon-transition in T1, one can move forward in T1 (only) and then repeat this operation (state 1) until a possible match occurs which would lead to the state 0 again; similarly if there is an epsilon-transition in T2, one can move forward in T2 (only) and then repeat this operation (state 2) until a possible match occurs which would lead to the state 0.

Figure 10:
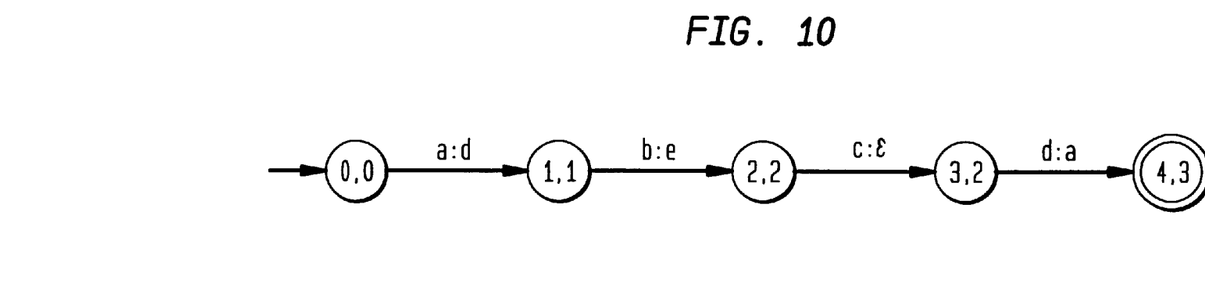
FIG. 10 shows the transducer result of the composition using the transducers of FIG. 7 and the filter of FIG. 9.

In principle, one needs to compose T1 with the filter in the usual way, and then compose the result with T2 to obtain the general composition in the weighted case. However, given the small size of the filter, one can simulate its presence and include its restrictions directly in the composition algorithm. This leads to a general definition of composition which gives the correct result for any two weighted finite-state transducers. The dotted lines in FIG. 8 show the transitions this filter expands. In fact, additional refinements allow one to avoid creating even transitions such as (1,1) to (1,2) and (1,1) to (2,1). The transducer result of this composition is shown in FIG. 10.

The described filter can be used in an on-demand expansion of two weighted finite-state transducers to directly produce the result. It is symmnetric, which keeps the overall operation of composition of two transducers symmetric as well.

SYSTEM EMBODIMENT OF INVENTION

Figure 11:
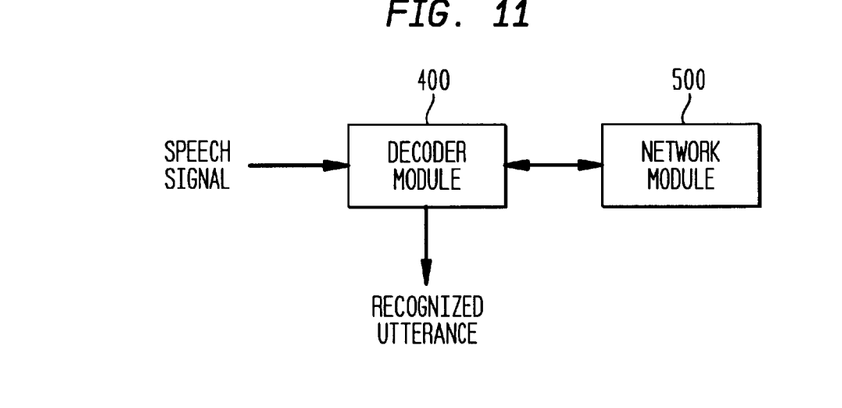
FIG. 11 provides an overview of a recognition system implementation of the invention.
Figure 12:
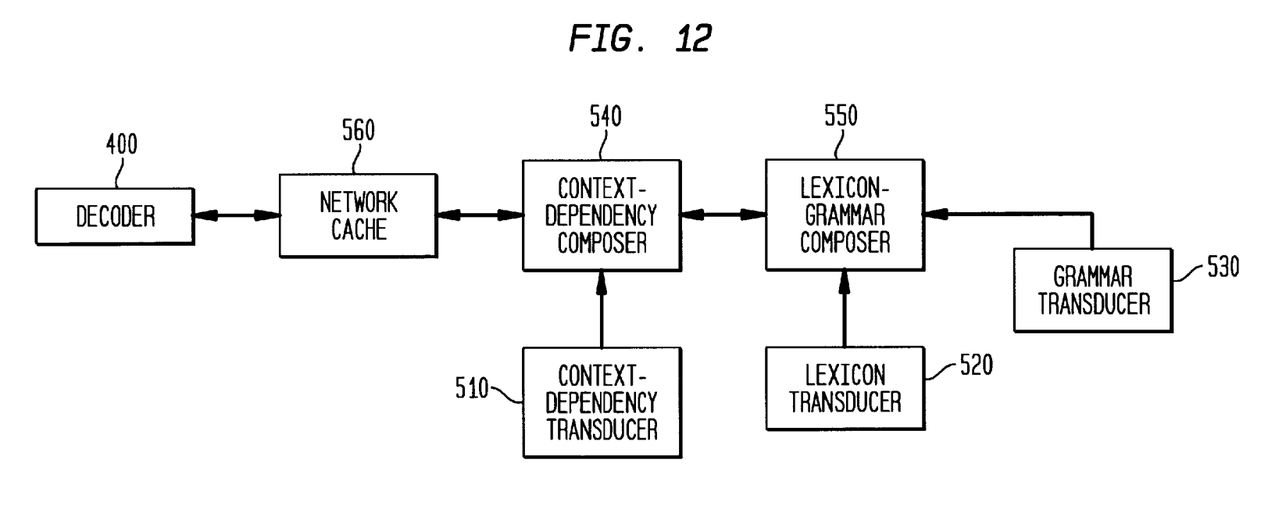
FIG. 12 provides a more detailed illustration of the Decoder Module shown in FIG. 11.

A manifestation of the method of the invention in an exemplary speech recognition system is illustrated in FIGS. 11 and 12, and will be described below. FIG. 11 provides an overview of the recognition system implementation of the invention, and FIG. 12 provides a more detailed illustration of the Network Module shown in FIG. 11.

Referring first to FIG. 11, it can be seen that speech is fed into a decoder module 400, where it is analyzed into acoustic features that are matched by the decoder against possible context-dependent phonetic paths specified by a network module 500. As the decoder module analyzes the speech, it first requests and receives the start state from the context-dependent network. Given the current state, the decoder then requests the transitions (i.e., arcs) leaving that state and explores those partial paths, with unpromising paths (based on their acoustic and grammar match scores) being pruned. This process is repeated until the final network states are reached. The best scoring path is then output as the recognition hypothesis. In this arrangement, the decoder functions correctly whether the network is expanded on-demand or is statically specified.

In FIG. 12, an expansion of Decoder Module 500 of FIG. 11 is depicted. For this illustrative example, the Network Module is shown to consist of three transducers that specify the context-dependent units (transducer 510), pronunciation lexicon (transducer 520) and grammar, or language model (transducer 530), two composers that combine these transducers (context-dependency composer 540 and lexicon-grammar composer 550) and a network cache 560. When the decoder requests a state and its outgoing transitions, the cache is first examined to see if that information has already been computed and stored in its memory (such memory being initially empty). If so, that information from the cache is returned to the decoder. Otherwise, the cache passes the request on to the context-dependency composer, which looks up the requested state in its memory, finding the corresponding pair of states (S1, S2) from the context-dependency transducer and the output of the lexicon-grammar composer, respectively—initially, just the pair of start states. The context-dependency composer then merges the outgoing transitions of S1 from the context-dependency transducer with the outgoing transitions of S2 that are requested and returned from the lexicon-grammar composer. This data is returned to the cache which stores the information in its memory (subject to possibly later being flushed from the memory in accord with a predetermined cache discipline). The lexicon-grammar composer works similarly except that it combines the pronunciation lexicon transducer with the grammar transducer.

CONCLUSION

A novel system and method has been disclosed herein for an on-demand expansion of context-dependent grammar networks. As an evaluation of the method of the invention an existing recognition task was conducted with the following transducer sizes:

|  | states | arcs |
| --- | --- | --- |
| context | 2809 | 148877 |
| lexicon | 3413 | 4596 |
| grammar | 5828 | 39560 |
| full expansion | $\approx 2.5 \times 10^5$ | $\approx 5 \times 10^5$ |

For the same recognition accuracy as with a static, fully expanded network, on-demand composition according to the invention expands just 2.3% of the total number of arcs while adding no noticeable run-time overhead—i.e., the processing time for the on-demand expansion falls within time intervals during which other necessary recognizer processes are being carried out.

It should be clear that the on-demand composition algorithm described above could be used as a subroutine in a standard Viterbi decoder to combine, on demand, a language model, a multi-pronunciation lexicon with corpus-derived pronunciation probabilities, and a context-dependency transducer. The external interface to composed transducers does not distinguish between on-demand and precomputed compositions, so the decoder algorithm is the same as for an explicit network.

Finally, while the focus here has been on triphonic contexts and finite-state language models, it is to be emphasized that the methodology of the invention applies much more generally. Any bounded-memory context-dependency can be modeled as a transducer, for instance, any context model based on decision trees. The method of the invention may also be usefully applied for morphological systems (particular as to language), optical character recognition systems, and other language processing tasks (e.g., text normalization). Furthermore, any language model-class closed under composition with finite-state transducers, such as probabilistic context-free grammars, is compatible with the method of the invention.

Although the present embodiment of the invention has been described in detail, it should be understood that various changes, alterations and substitutions can be made therein without departing from the spirit and scope of the invention as defined by the appended claims.

What is claimed is:

1. In a speech processing system wherein predetermined linguistic information is represented in a hierarchal cascade of network models and a linkage between successive levels of said network models is defined by a mapping function, and wherein at least one path within each said network model is defined by connections among a plurality of predetermined states, a method for input speech evaluation by on-demand expansion of a selected portion of at least one of said network models comprising the steps of:

formulating said at least one of said network models as a finite state transducer, said transducer representing said mapping function between said at least one network model and an adjacent one of said cascaded network models;

selecting a state in a one of said at least one transducers having a correspondence to said selected portion of said at least one network model;

composing said one of said at least one transducers with a next successively higher level of said network models to prescribe a mapped portion of said next successively higher level corresponding to said selected portion of said at least one network model;

iteratively repeating said selecting step and said composing step for each successively higher level network model representing said selected portion; and evaluating an input speech signal against a candidate speech segment provided by one of said network models.

2. The method for on-demand expansion of claim 1 wherein at least one of said levels of said network cascade is represented in terms of context dependent units.

3. The method for on-demand expansion of claim 1 wherein said selecting step and said composing step are implemented as a generalized state machine C, said machine being created as a composition of a generalized state machine A, corresponding to said one of said at least one transducers, with a generalized state machine B, corresponding to said next successively higher level of said network cascade.

4. The method for on-demand expansion of claim 3 wherein said generalized state machine C supports the functions:

C.start:=returns A.start paired with B.start

C.final((s1,s2)):=for state s1,s2, returns A.final(s1) $\hat{\cup}$ B.final(s2)

C.arcs((s1,s2)):=for state s1,s2, returns Merge(A.arcs(s1), B.arcs(s2))

where merged arcs are defined as:

(label 1, label 3, x+y, (next state 1, next state 2)) Î Merge(A.arcs(s1), B.arcs(s2))

iff (label 1, label 2, x, next state 1) Î A.arcs(s1) and (label 2, label 3, y, next state 2) Î B.arcs(s2);

where, using M to represent any of generalized state machines C, A or B:

M.start returns, on request, the start state for machine M;

M.final(state) represents probability of accepting at a given state; and

M.arcs(state) returns, for a given state, transitions ($a_1$, $a_2$, ... $a_N$) leaving the given state, where $a_i$=(input label, output label, weight & next state).

5. The method for on-demand expansion of claim 1 further including a step of storing at least a part of said on-demand expansion of said selected portion of said network cascade in a storage cache.

6. The method for on-demand expansion of claim 5 wherein said storage cache is implemented as a generalized state machine of the form:

N.start:=M.start

N.final(state):=M.final(state)

N.arcs(state):=M.arcs(state)

where:

M represents an input machine and N represents said cache machine;

M.start returns, on request, the start state for machine M;

M.final(state) represents probability of accepting at a given state; and

M.arcs(state) returns, for a given state, transitions ($a_1$, $a_2$, ... $a_N$) leaving the given state, where $a_i$=(input label, output label, weight & next state); and corresponding functions of generalized state machine N are equivalently defined.

7. The method for on-demand expansion of claim 1 wherein said selected portion of said network cascade corresponds to an unknown speech fragment of interest.

8. The method for on-demand expansion of claim 1 further including the step of inserting a filter in said composition of said one of said at least one transducers with said next successively higher level, wherein said filter operates to remove redundant paths occurring between a pair of states in said composition.

9. The method for on-demand expansion of claim 8 wherein said filter is manifested as a finite state transducer.

10. A speech processing system operable to provide on-demand expansion of a selected portion of a linguistic model, wherein predetermined linguistic information established for training said system is represented in a hierarchal cascade of network models and a linkage between successive levels of said network models is defined by a mapping function, and wherein at least one path within each said network model is defined by connections among a plurality of predetermined states, said system comprising:

decoding means for evaluating input speech signals against a candidate speech segment provided by one of said network models;

a finite state transducer operable to represent said mapping function between at least one of said network models and an adjacent one of said cascaded network models;

means for selecting a state in said transducer having a correspondence to said selected portion of said network model;

means for composing said transducer with a next successively higher level of said network model to prescribe a mapped portion of said next successively higher level corresponding to said selected portion of said network model; and means for iteratively applying said transducer and said composing means to successively higher level network models representing said selected portion.

11. The speech processing system of claim 10 further characterized in that at least one of said levels of said network cascade is represented in terms of context dependent units.

12. The speech processing system of claim 10 further characterized in that said selecting step and said composing step are implemented as a generalized state machine C, said machine being created as a composition of a generalized state machine A, corresponding to said one of said at least one transducers, with a generalized state machine B, corresponding to said next successively higher level of said network cascade.

13. The speech processing system of claim 12 wherein said generalized state machine C supports the functions:

C.start:=returns A.start paired with B.start

C.final((s1,s2)):=for state s1,s2, returns A.final(s1) Ù B.final(s2)

C.arcs((s1,s2)):=for state s1,s2, returns Merge(A.arcs(s1), B.arcs(s2))

where merged arcs are defined as:
(label 1, label 3, x+y, (next state 1, next state 2)) Î Merge(A.arcs(s1), B.arcs(s2))

iff
(label 1, label 2, x, next state 1) Î A.arcs(s1) and (label 2, label 3, y, next state 2) Î B.arcs(s2);

where, using M to represent any of generalized state machines C, A or B:

M.start returns, on request, the start state for machine M;

M.final(state) represents probability of accepting at a given state; and

M.arcs(state) returns, for a given state, transitions ($a_1$, $a_2$, . . . $a_N$) leaving the given state, where $a_i$=(input label, output label, weight & next state).

14. The speech processing system of claim 10 further including a storage cache for storing at least a part of said on-demand expansion of said selected portion of said network cascade.

15. The speech processing system of claim 14 wherein said storage cache is implemented as a generalized state machine of the form:

N.start:=M.start

N.final(state):=M.final(state)

N.arcs(state):=M.arcs(state)

where:
M represents an input machine and N represents said cache machine;

M.start returns, on request, the start state for machine M;

M.final(state) represents probability of accepting at a given state; and

M.arcs(state) returns, for a given state, transitions ($a_1$, $a_1$, . . . $a_N$) leaving the given state, where $a_i$=(input) label, output label, weight & next state); and corresponding functions of generalized state machine N are equivalently defined.

16. The speech processing system of claim 10 further characterized in that said selected portion of said network cascade corresponds to an unknown speech fragment of interest.

17. The speech processing system of claim 10 further including a filter means operative to remove redundant paths occurring between a pair of states in a composition created by said means for composing.

18. In a system for recognition of an unknown pattern in an input signal, said pattern being indicative of underlying information content, wherein data applied to train said system are represented in a hierarchal cascade of network models and a linkage between successive levels of said network models is defined by a mapping function, and wherein at least one path within each said network model is defined by connections among a plurality of predetermined states, a method for input pattern evaluation by on-demand expansion of a selected portion of at least one of said network models comprising the steps of:

formulating said at least one of said network models as a finite state transducer, said transducer representing said mapping function between said at least one network model and an adjacent one of said cascaded network models;

selecting a state in a one of said at least one transducers having a correspondence to said selected portion of said at least one network model;

composing said one of said at least one transducers with a next successively higher level of said network models to prescribe a mapped portion of said next successively higher level corresponding to said selected portion of said at least one network model;

iteratively repeating said selecting step and said composing step for each successively higher level network model representing said selected portion; and evaluating an input signal pattern against a candidate pattern segment provided by one of said network models.

19. The method for on-demand expansion of claim 18 wherein at least one of said levels of said network cascade is represented in terms of context dependent units.

20. In a system for processing linguistic information in an input signal, wherein predetermined linguistic information established for training said system is represented in a hierarchal cascade of network models and a linkage between successive levels of said network models is defined by a mapping function, and wherein at least one path within each said network model is defined by connections among a plurality of predetermined states, a method for evaluation of input linguistic information by on-demand expansion of a selected portion of at least one of said network models comprising the steps of:

formulating said at least one of said network models as a finite state transducer, said transducer representing said mapping function between said at least one network model and an adjacent one of said cascaded network models;

selecting a state in a one of said at least one transducers having a correspondence to said selected portion of said at least one network model;

composing said one of said at least one transducers with a next successively higher level of said network models to prescribe a mapped portion of said next successively higher level corresponding to said selected portion of said at least one network model;

iteratively repeating said selecting step and said composing step for each successively higher level network model representing said selected portion; and evaluating an input linguistic-information signal against a candidate linguistic-information segment provided by one of said network models.

21. In a system for processing linguistic information, wherein predetermined linguistic information established for training said system is represented in a hierarchal cascade of network models and a linkage between successive levels of said network models is defined by a mapping function, and wherein at least one path within each said network model is defined by connections among a plurality of predetermined states, a sub-system for providing on-demand expansion of a selected portion of at least one of said network models, comprising:

decoding means for evaluating an input linguistic-information signal against a candidate linguistic-information segment provided by one of said network models     means for formulating said at least one of said network models as a finite state transducer, said transducer representing said mapping function between said at least one network model and an adjacent one of said cascaded network models;

means for selecting a state in a one of said at least one transducers having a correspondence to said selected portion of said at least one network model;

means for composing said one of said at least one transducers with a next successively higher level of said network models to prescribe a mapped portion of said next successively higher level corresponding to said selected portion of said at least one network model; and     means for iteratively applying said means for selecting and said means for composing for successively higher level network models representing said selected portion.

\* \* \* \* \*